United States Patent [19]
Richardson

[11] Patent Number: 5,698,860
[45] Date of Patent: Dec. 16, 1997

[54] EDGE POSITION SENSOR FOR MAGNETIC TAPE USING LIGHT PIPES

[75] Inventor: Kenneth G. Richardson, Fort Collins, Colo.

[73] Assignee: Hewlett-Packard Company, Palo Alto, Calif.

[21] Appl. No.: 282,120

[22] Filed: Jul. 28, 1994

[51] Int. Cl.$^6$ .................................................. G01N 21/30
[52] U.S. Cl. ........................... 250/559.12; 250/227.11; 250/227.28; 250/557; 360/128
[58] Field of Search ............................ 250/561, 557, 250/548, 227.11, 570, 559.3, 559.12, 559.13, 227.24, 227.28; 356/375, 387; 360/77.12, 128

[56] References Cited

U.S. PATENT DOCUMENTS

| | | | |
|---|---|---|---|
| 3,617,759 | 11/1971 | Martin | 250/234 |
| 3,936,878 | 2/1976 | Chrysler | 360/98 |
| 4,110,627 | 8/1978 | Isherwood | 250/561 |
| 4,286,201 | 8/1981 | Roecks et al. | 318/640 |
| 4,390,917 | 6/1983 | Watanabe | 360/128 |
| 4,937,593 | 6/1990 | Prats | 346/139 R |
| 5,075,543 | 12/1991 | Courtney | 250/223 R |
| 5,130,556 | 7/1992 | Duncan et al. | 250/560 |
| 5,222,003 | 6/1993 | Miller et al. | 360/74.6 |
| 5,260,583 | 11/1993 | Rye . | |
| 5,300,787 | 4/1994 | Schrauwen et al. | 250/548 |
| 5,365,383 | 11/1994 | Miller et al. | 360/69 |
| 5,395,067 | 3/1995 | Kano et al. | 242/344 |

*Primary Examiner*—Stephone Allen
*Attorney, Agent, or Firm*—Augustus W. Winfield

[57] ABSTRACT

A position sensor for providing an electronic output indicating the magnitude of transverse movement of an edge of a magnetic tape. A first light pipe and lens arrangement is used to deliver light to one side of a tape. A second light pipe with a small light receiving aperture is used to receive light and to deliver the received light to a detector. The focal point for the lens in the first light pipe is at the receiving aperture of the second light pipe, enabling the aperture to be very small but still receive substantially all the transmitted light. The light pipe arrangement enables use of a variety of light sources and light detectors without having to place either a source or a detector physically close to the tape or the magnetic head.

3 Claims, 3 Drawing Sheets

EDGE POSITION SENSOR FOR MAGNETIC TAPE USING LIGHT PIPES

FIELD OF INVENTION

This invention relates generally to magnetic tape drives and more specifically to sensors for detecting an edge of a magnetic tape.

BACKGROUND OF THE INVENTION

Magnetic tapes for data storage typically have multiple parallel data tracks. When a magnetic tape is mechanically moved past a stationary head, there is some undesirable but unavoidable tape movement transverse to the intended direction of movement. The transverse tape movement is a significant limitation to the track density that can be achieved. One solution is to minimize the transverse movement by improving tape guidance. Improved tape guidance can limit transverse movement to a few micrometers. Even smaller movement of the tape relative to the head can be achieved by measuring the transverse movement in real time and adjusting the head position to the position of the tape. The position detector must be able to measure movement on the order of a few micrometers. Also, it is desirable to measure the tape position very close to the head to minimize any difference between the tape position at the detector and the tape position at the head. With many drive designs, the area around the magnetic head is very constrained, leaving little room for an position sensor. There is a need for a magnetic tape edge sensor that can measure the position of a tape edge very close to a magnetic head while occupying minimal space near the magnetic head.

SUMMARY OF THE INVENTION

The invention provides a tape edge sensor capable of measuring small transverse displacement and having a physically small sensor area that can be placed near a magnetic head. A first light pipe and lens arrangement is used to deliver light to one side of a tape. A second light pipe with a small light receiving aperture is used to receive light and to deliver the received light to a detector. The focal point for the lens in the first light pipe is at the receiving aperture of the second light pipe, enabling the aperture to be very small but still receive substantially all the transmitted light. The second light pipe is preferably conical to provide mechanical support. The light pipe arrangement enables use of a variety of light sources and light detectors without having to place either a source or a detector physically close to the tape or the magnetic head.

DETAILED DESCRIPTION OF THE PREFERRED EMBODIMENT OF THE INVENTION

Figure 1:
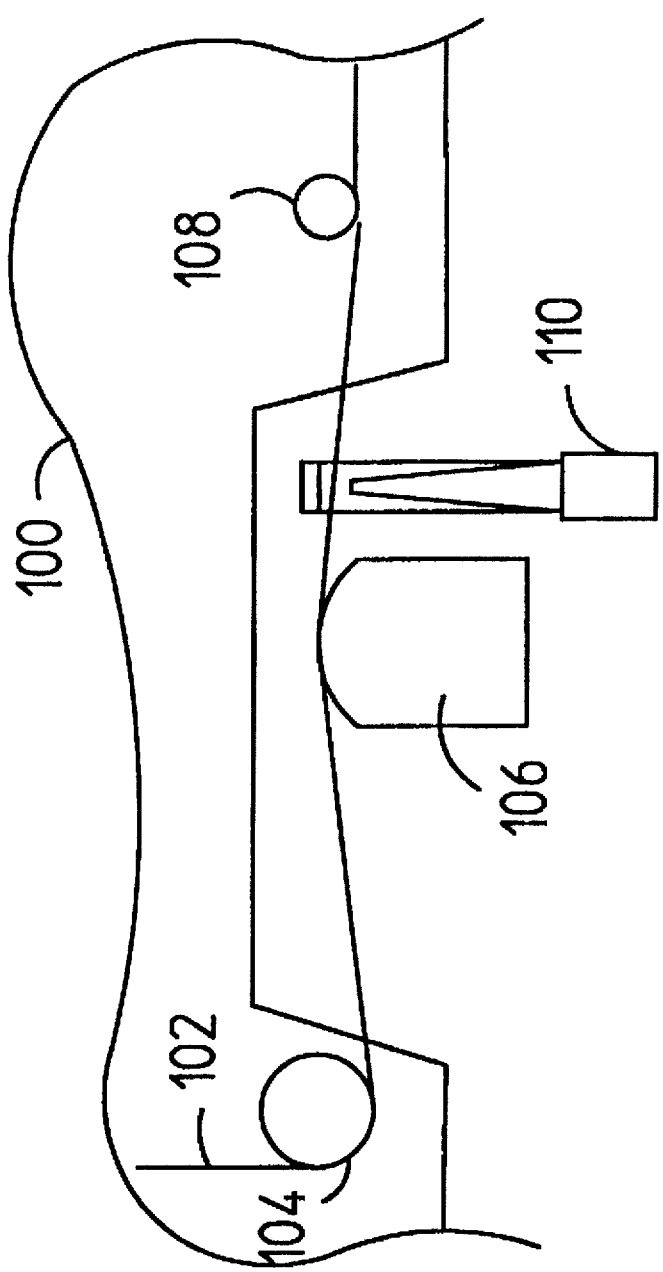
FIG. 1 is a top view of a portion of a tape cartridge plus a magnetic head and an edge sensor.

FIG. 1 is a plan view illustrating a portion of a tape cartridge 100. A magnetic tape 102 wraps around a first guide 104, moves past a magnetic head 106, and past a second guide 108. An edge sensor 110 provides an electronic signal indicating the position of the lower edge of the tape 102 as described below. For purposes of illustration, the edge sensor 110 is depicted in FIG. 1 as being placed between the head 106 and the second guide 108 and sensing the bottom edge of the tape 102. The edge sensor 110 may alternatively be placed between the head 106 and the first guide 104. For either position relative to the head 106, the edge sensor 110 may alternatively be placed to sense the top edge of the tape 102. The important design parameter is to sense an edge of the tape 102 as closely as possible to the head 106.

Figure 2:
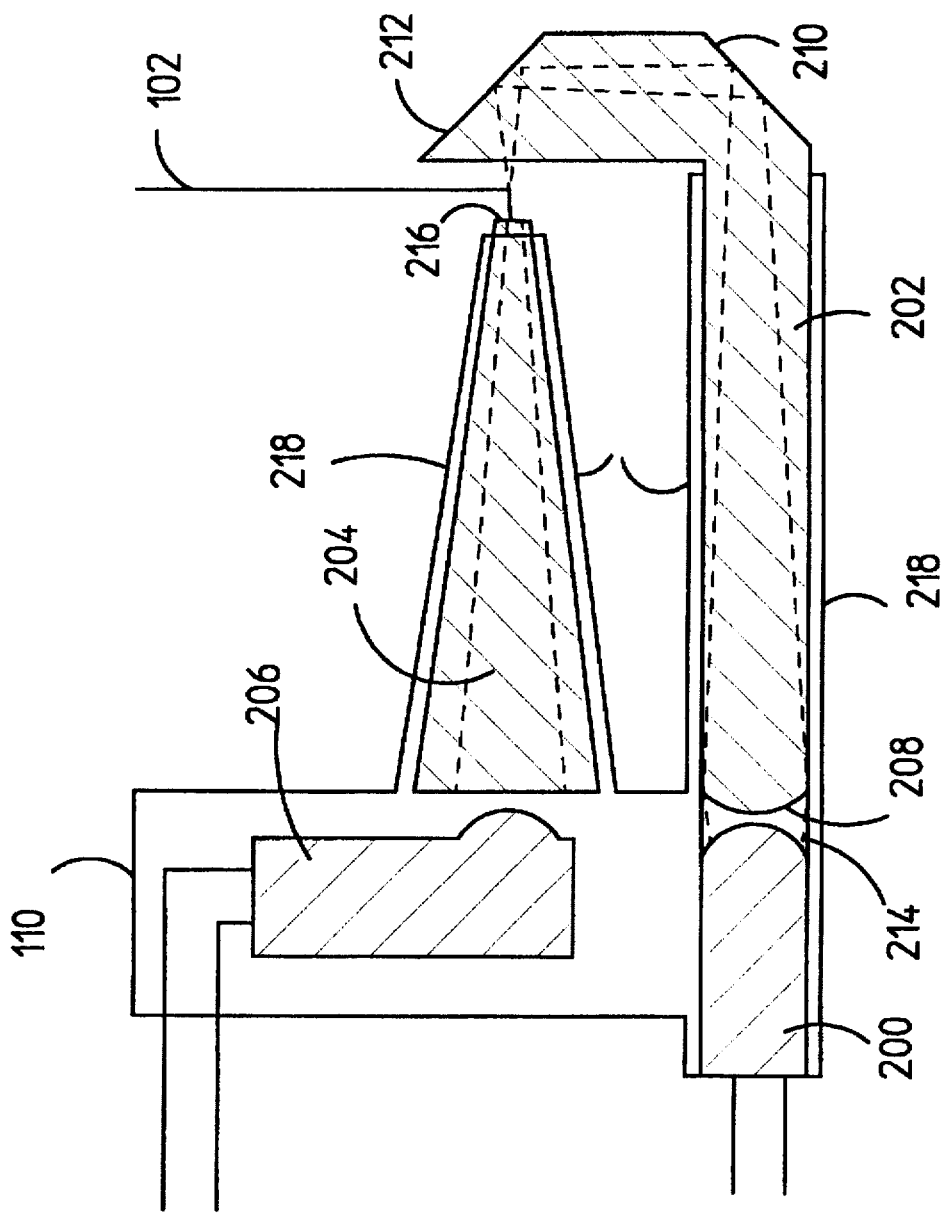
FIG. 2 is a cross section of the edge sensor.

FIG. 2 is a cross section of the edge sensor 110. A light emitting diode (LED) 200 provides a source of light. The light passes through a first light pipe 202 to the back of the tape 102, past the lower edge of the tape 102, through a second light pipe 204, to a light detector 206. Reflecting surfaces 210 and 212 redirect light from the front of the tape 102 to the back of the tape 102. The first light pipe 202 has an integral concentrating lens 208 at the light receiving end. The second light pipe receives light through a very small aperture 216, enabling measurement of small transverse movement of the edge of the tape 102. Note from the sample light ray trace 214 that the lens 208 has a focal point at the light receiving aperture 216 of the second light pipe 204. Having the focal point of the lens 208 at the aperture 216 enables a maximum amount of light to pass through the small aperture.

For low cost and ease of manufacturing, both light pipes (202 and 204) are preferably molded using a transparent thermoplastic with a high index of refraction such as polycarbonate. Ideally, all light entering the integral lens 208 is reflected off the inner surfaces of the first light pipe 202. With a high index material such as polycarbonate no external reflective coating is required, even at surfaces 210 and 212. An opaque covering 218 prevents entry of extraneous external light. The second light pipe 204 is conically shaped for ease of manufacturing and mechanical rigidity. The aperture at the tip 216 is about 0.5 mm (0.02 inches) to enable measurement of transverse tape wander with a range on the order of 0.25 mm (0.01 inches) either side of a nominal position. The second light pipe could therefore be a uniform cylinder with a diameter of 0.5 mm (0.02 inches). Such a small cylinder would require mechanical support. A cone shaped light pipe as depicted is self supporting with substantial rigidity, can be easily molded, and has an additional advantage of retaining some light that would escape from a uniform cylinder.

The sensor 110 must avoid interference with the tape when the tape is inserted or removed. In the configuration illustrated in FIGS. 1 and 2, the edge sensor 110 must be lowered to clear the lower edge of the tape 102 during insertion or removal of the tape cartridge 100 and raised to a predetermined location (nominal tape edge) when the cartridge is seated.

The light pipe arrangement of FIGS. 1 and 2 enables use of a wide variety of light sources and detectors while still providing a small measurement area adjacent to the tape 102 and near the head 106. Choice of a light source and detector in the sample embodiment were based on minimizing cost. Accordingly, in FIG. 2, the light source is depicted as an LED 200 with a domed shaped output surface but LED's with light emitted from flat faces or flat edges may be used. Alternatively, other light source technologies may be used. In the sample embodiment, the LED 200 emits light in the infrared region and the light detector 206 is a phototransistor sensitive to light in the infrared region. Suitable LED's include Sharp GL-527 and Motorola MLED-81. Suitable detectors include Lite-On LTR-301 Bin C or D and Optek OP-500C.

Figure 3:
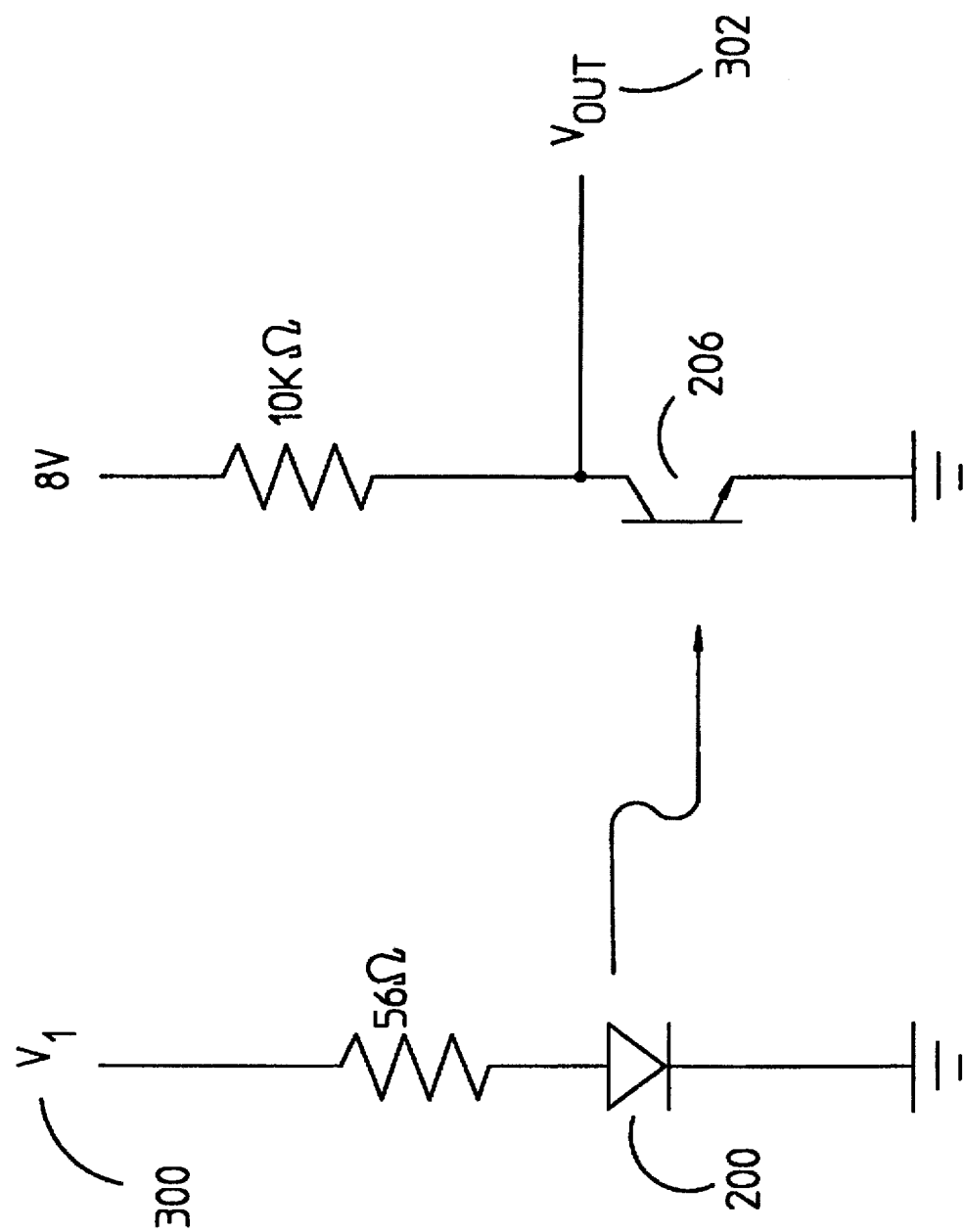
FIG. 3 is a schematic illustrating an example circuit using the edge sensor.

FIG. 3 is a simplified schematic of the LED 200 and phototransistor 206 to illustrate the sensitivity obtained in the sample embodiment. In the circuit depicted in FIG. 3, if no light impinges onto phototransistor 206 the output voltage 302 is approximately 8 volts. With no tape present, the LED voltage $V_1$ (300) is increased until sufficient light is generated by the LED 200 to decrease the output voltage 302 to approximately 4 volts. The edge sensor 216 is then placed so that when the tape edge is at the nominal position, the tape partially blocks the light increasing the output voltage to approximately 6 volts. The output voltage then varies approximately 18 millivolts per micrometer (450 millivolts per 0.001 inch) of transverse displacement of the tape 102.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An apparatus for use in a sensor for sensing lateral movement of an edge of a tape, the apparatus comprising:

a source of light; and a light pipe having a light receiving area, light from the source of light passing by the edge of the tape and into the light receiving area, the light receiving area having a height that is approximately the same as an expected range of lateral movement of the edge of the tape, the light pipe sufficiently rigid to hold the light receiving area at a fixed location.

2. The sensor of claim 1, the light pipe having a conical shape.

3. The sensor of claim 1, the source of light further comprising:

a lens, light passing through the lens being focused at the light receiving area of the light pipe.

* * * * *